May 6, 1930.  F. E. WYMAN  1,757,069
DIFFERENTIAL MECHANISM
Filed Feb. 10, 1930
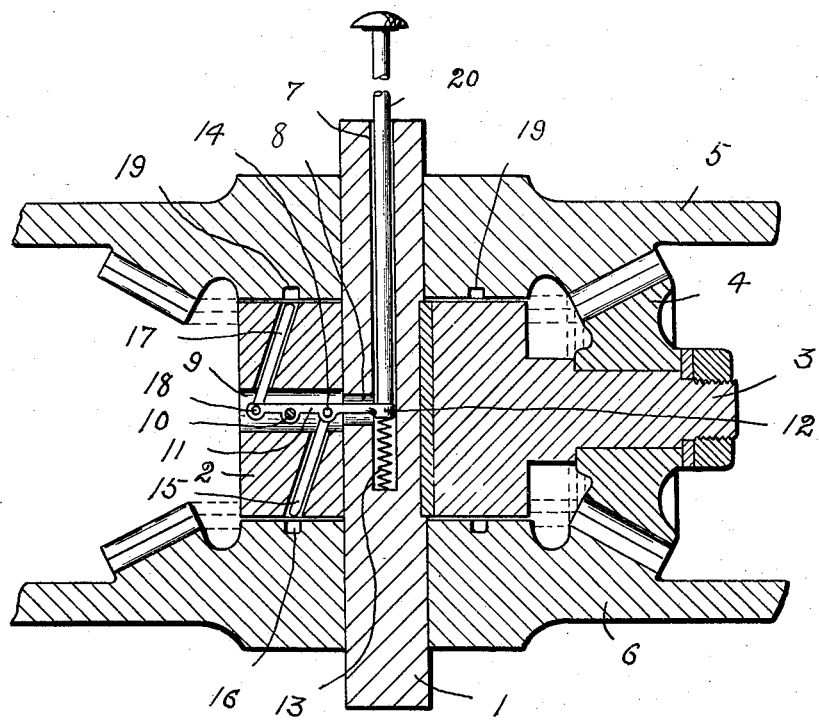
Inventor
Frank E. Wyman.
By
Geo. Stevens.
Attorney Patented May 6, 1930

1,757,069

UNITED STATES PATENT OFFICE

FRANK E. WYMAN, OF FAUNCE, MINNESOTA

DIFFERENTIAL MECHANISM

Application filed February 10, 1930. Serial No. 427,147.

This invention pertains to differential mechanisms and relates particularly to means for optionally locking or unlocking such a mechanism.

In the embodiment here illustrated, the transmission device for automobiles shown in my Patent No. 1,742,744 of Jan. 7, 1930, is illustrated as being applicable to such locking means. However it is apparent that any such device wherein two freely rotative elements are mounted upon a shaft carrying a power transmission device intermediate of same and common to both is equally susceptible to the installation of such mechanism.

The principal object of the invention is to provide a simple, selective, manually operative lock.

The accompanying drawing forming part of this application and in which like reference characters indicate like parts is a transverse sectional view through a shaft upon which is mounted a differential mechanism such as shown in my former patent above referred to.

1 represents the driving shaft upon which is keyed the hub-like member 2 carrying a plurality of radially disposed arms or gudgeons 3 upon which are mounted the intermediate beveled gears 4, there however being but one of such gudgeons and gears shown in this illustration as the installation of the locking mechanism may occur intermediate of two such gudgeons and there may be an even or odd number of the latter as preferred.

The gear or pinion 4 is illustrated as being in constant mesh with the two geared discs 5 and 6, which, in this illustration, are loosely mounted one above the other on the vertically disposed shaft 1, and a gear driven shaft not shown from the disc 5 drives one of the wheels of the automobile while a gear driven shaft from the disc 6 drives the other, such arrangement being common in the art of automobile construction.

It is obvious that in such a mechanism if either one of the gears 5 or 6 requires more power than the other, the differential mechanism will compensate for such unequal stress, and in the event of the device being used in connection with the driving wheels of an automobile the desirability of being able to lock the differential thus causing equal power being applied to both the discs 5 and 6 is readily apparent.

The locking mechanism here illustrated comprises the making of the shaft 1 hollow axially from the uppermost end to a point some distance below the central point in respect to the hub 2, thus providing an axial hole 7 therein, and approximately centrally of the hub and through one side of the shaft is formed the hole or opening 8 which registers with though preferably smaller than a radially disposed hole or aperture 9 through the hub 2. In this opening 9 is installed and pivotally mounted as at 10 the lever 11, the innermost end of which is somewhat enlarged as at 12, and occurs within the hole 7 of the shaft. Below this enlarged head of the lever 11 is installed an expansive helical spring 13 which biases the inner end of the lever towards its uppermost limit. Intermediate of this end of the lever and the pivotal mounting 10 is pivotally attached as at 14 the locking dog 15 disposed obliquely within a channel in the lower portion of the hub 2 and extendible from the lower face of the hub for engagement within any one of a series of concentrically arranged holes 16 in the uppermost face of the disc gear 6.

A similar locking dog 17 is pivotally mounted as at 18 to the outermost end of the lever 11 and is slidably operable in a diagonally disposed channel in the upper half of the hub 2 and extendible beyond the upper face thereof for engagement with any one of a like series of holes 19 in the lower face of the disc gear 5.

As a means for optionally operating the lever 11 I have shown the pintle or pitman 20 installed within a hole 7 of the shaft and impinging the enlarged end 12 of the lever above the spring 13 and it is apparent that this pitman may be operated in any desired manner manually and provided with means for its being retained in its depressed or extended position, but in the event of not being thus provided it is designed to be held in locked position by hand, or by the stress upon the dogs if the latter is continued, otherwise the action of the spring 13 will tend to restore the lever to its normal horizontal position, thus withdrawing the dogs 15 and 16 from active locked engagement with the discs 5 and 6.

From the above it is apparent that when it becomes desirable to rotate the discs 5 and 6 in fixed relation, all that is necessary is to depress the pitman 20, thus locking the hubs of the discs to the driving hub 2, and when the pitman 20 is released the normal action of the spring 12 will release the mechanism so that normal action of the differential will occur; it further being obvious that the device is applicable to various forms of differential mechanisms apart from that here specifically referred to.

Having thus described my invention, what I claim and desire to secure by Letters Patent, is:

1. The combination with differential gear mechanism including a driving shaft, a hub thereupon, having radially disposed gears intermediate of and driving separate disc gears, of means carried within the hub and selectively operable axially of the shaft for locking said differential.

2. The combination with a shaft having a differential intermediate of opposed driven elements, of manually controlled means operable axially of the shaft for locking or unlocking the differential.

3. A differential control mechanism comprising in combination two driven elements, a driving hub intermediate of said elements, means carried by said hub for selective engagement with said elements.

4. A differential control mechanism comprising in combination a shaft, two driven elements upon said shaft, driving means intermediate of said driven elements, locking means carried by said intermediate means, and means operable longitudinally the shaft for control of the locking means.

5. In combination a shaft, a differential on said shaft, optional locking means cooperatively associated with said differential and means for operating the locking means disposed axially of the shaft.

In testimony whereof I affix my signature.

FRANK E. WYMAN.